US012347153B2

(12) United States Patent
Yang et al.

(10) Patent No.: US 12,347,153 B2
(45) Date of Patent: Jul. 1, 2025

(54) VIDEO CONTENT PROVIDING METHOD AND VIDEO CONTENT PROVIDING DEVICE

(71) Applicant: ASPEED Technology Inc., Hsinchu (TW)

(72) Inventors: Chien-Chou Yang, Hsinchu (TW); Chen-Wei Chou, Hsinchu (TW)

(73) Assignee: ASPEED Technology Inc., Hsinchu (TW)

(*) Notice: Subject to any disclaimer, the term of this patent is extended or adjusted under 35 U.S.C. 154(b) by 361 days.

(21) Appl. No.: 17/892,138

(22) Filed: Aug. 22, 2022

(65) Prior Publication Data

US 2023/0105785 A1 Apr. 6, 2023

(30) Foreign Application Priority Data

Sep. 17, 2021 (TW) .................. 110134749

(51) Int. Cl.
*G06V 10/22* (2022.01)
*G06V 10/25* (2022.01)
*H04N 21/439* (2011.01)

(52) U.S. Cl.
CPC ............ *G06V 10/235* (2022.01); *G06V 10/25* (2022.01); *H04N 21/4394* (2013.01)

(58) Field of Classification Search
CPC .. G06V 10/235; G06V 10/25; H04N 21/4394; H04N 7/15; H04N 21/439; H04N 21/4788
See application file for complete search history.

(56) References Cited

U.S. PATENT DOCUMENTS

| 5,686,957 A | * | 11/1997 | Baker | G02B 3/0087 |
| | | | | 348/E7.083 |
| 8,416,715 B2 | * | 4/2013 | Rosenfeld | H04M 3/567 |
| | | | | 379/202.01 |

(Continued)

FOREIGN PATENT DOCUMENTS

| CN | 102256098 | 11/2011 |
| CN | 105657329 | 6/2016 |

(Continued)

OTHER PUBLICATIONS

"Office Action of Taiwan Counterpart Application", issued on Aug. 14, 2024, pp. 1-12.

(Continued)

*Primary Examiner* — Wesley J Tucker
(74) *Attorney, Agent, or Firm* — JCIPRNET (57) ABSTRACT

A video content providing method and a video content providing device are provided. The method includes the following. A wide viewing angle image stream and a corresponding first audio content are obtained. A plurality of regions of interest in the wide viewing angle image stream are determined, and candidate regions in the regions of interest are integrated into a first frame. A designated region is selected from the candidate regions, and a corresponding first audio component are found from the first audio content. Each first audio component is suppressed to adjust the first audio content into a second audio content. The first frame and the second audio content are integrated into a specific video content, and the specific video content is provided.

20 Claims, 9 Drawing Sheets

(56) References Cited

U.S. PATENT DOCUMENTS

| | | | |
|---|---|---|---|
| 9,854,101 | B2 | 12/2017 | Pandey et al. |
| 9,866,952 | B2 | 1/2018 | Pandey et al. |
| 10,331,396 | B2 | 6/2019 | Habets et al. |
| 10,491,857 | B1 | 11/2019 | Huang |
| 10,880,519 | B2 | 12/2020 | Natarajan et al. |
| 11,451,746 | B1 * | 9/2022 | Graybill ............... H04N 23/698 |
| 2007/0223731 | A1 | 9/2007 | Togami et al. |
| 2010/0283829 | A1 | 11/2010 | De Beer et al. |
| 2016/0227025 | A1 * | 8/2016 | Soby ................... H04M 19/042 |
| 2017/0032555 | A1 * | 2/2017 | Gingawa ............... H04N 23/741 |
| 2017/0127020 | A1 * | 5/2017 | Takahashi ............. H04R 1/406 |
| 2019/0281255 | A1 * | 9/2019 | Natarajan ................ H04N 7/15 |
| 2020/0195885 | A1 * | 6/2020 | Huang ................... H04N 7/147 |
| 2020/0358982 | A1 * | 11/2020 | Tsui ..................... H04R 29/005 |
| 2021/0110844 | A1 * | 4/2021 | Miyake ................ G06V 40/174 |
| 2021/0124912 | A1 * | 4/2021 | Lee ....................... G06F 16/583 |
| 2022/0060660 | A1 * | 2/2022 | Chou .................... H04N 7/147 |
| 2023/0013740 | A1 * | 1/2023 | Zheng .................... G10L 17/02 |
| 2023/0215011 | A1 * | 7/2023 | Lo ............................ H04N 7/15 |
| | | | 382/103 |
| 2024/0223707 | A1 * | 7/2024 | Seo ........................ G10L 17/02 |
| 2024/0257816 | A1 * | 8/2024 | Paiuk ..................... G10L 17/06 |

FOREIGN PATENT DOCUMENTS

| | | |
|---|---|---|
| CN | 108781310 | 11/2018 |
| CN | 112584084 | 3/2021 |
| CN | 113014983 | 6/2021 |
| TW | 201444371 | 11/2014 |
| TW | I750967 | 12/2021 |

OTHER PUBLICATIONS

"Office Action of China Counterpart No. 202111093439.X", issued on Apr. 30, 2025, p. 1-p. 10.

* cited by examiner

VIDEO CONTENT PROVIDING METHOD AND VIDEO CONTENT PROVIDING DEVICE

CROSS-REFERENCE TO RELATED APPLICATION

This application claims the priority benefit of Taiwanese application no. 110134749, filed on Sep. 17, 2021. The entirety of the above-mentioned patent application is hereby incorporated by reference herein and made a part of this specification.

BACKGROUND

Technical Field

The disclosure relates to a video content processing technology. Particularly, the disclosure relates to a video content providing method and a video content providing device.

Description of Related Art

In modern society, video conferences held through video software are already a common form of conferences. Currently, some manufacturers have provided relevant solutions to improve the sound reception quality for participants in the conference.

For example, some manufacturers provide a webcam accompanied with a directional microphone, in which a sound receiving direction of the directional microphone is configured to generally correspond to an imaging range of the webcam. Accordingly, it is possible to prevent receiving sounds outside the imaging range, thereby improving the sound reception quality.

However, for conference devices that capture wide-angle images and corresponding audio signals through a wide-angle lens, there currently exists no technical means that effectively improves the sound reception quality.

SUMMARY

In view of the above, the disclosure provides a video content providing method and a video content providing device, which may serve to solve the above technical problem.

The disclosure provides a video content providing method adapted for a video content providing device. The method includes the following. A wide viewing angle image stream is obtained, and a first audio content corresponding to the wide viewing angle image stream is obtained. The first audio content includes a plurality of audio components corresponding to a plurality of sound source directions. A plurality of regions of interest in the wide viewing angle image stream are determined, and at least one candidate region in the regions of interest is integrated into a first frame based on a designated frame layout. At least one designated region is selected from the at least one candidate region, and at least one first sound source direction not corresponding to the at least one designated region is obtained from the sound source directions. At least one first audio component corresponding to the at least one first sound source direction is found from the audio components. Each first audio component is suppressed to adjust the first audio content into a second audio content. The first frame and the second audio content are integrated into a specific video content, and the specific video content is provided.

The disclosure provides a video content providing device, including a storage circuit and a processor. The storage circuit stores a programming code. The processor is coupled to the storage circuit and accesses the programming code to: obtain a wide viewing angle image stream, and obtain a first audio content corresponding to the wide viewing angle image stream, in which the first audio content includes a plurality of audio components corresponding to a plurality of sound source directions; determine a plurality of regions of interest in the wide viewing angle image stream, and integrate at least one candidate region in the regions of interest into a first frame based on a designated frame layout; select at least one designated region from the at least one candidate region, and obtain at least one first sound source direction not corresponding to the at least one designated region from the sound source directions; find at least one first audio component corresponding to the at least one first sound source direction from the audio components; suppress each of the first audio component to adjust the first audio content into a second audio content; and integrate the first frame and the second audio content into a specific video content, and provide the specific video content.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
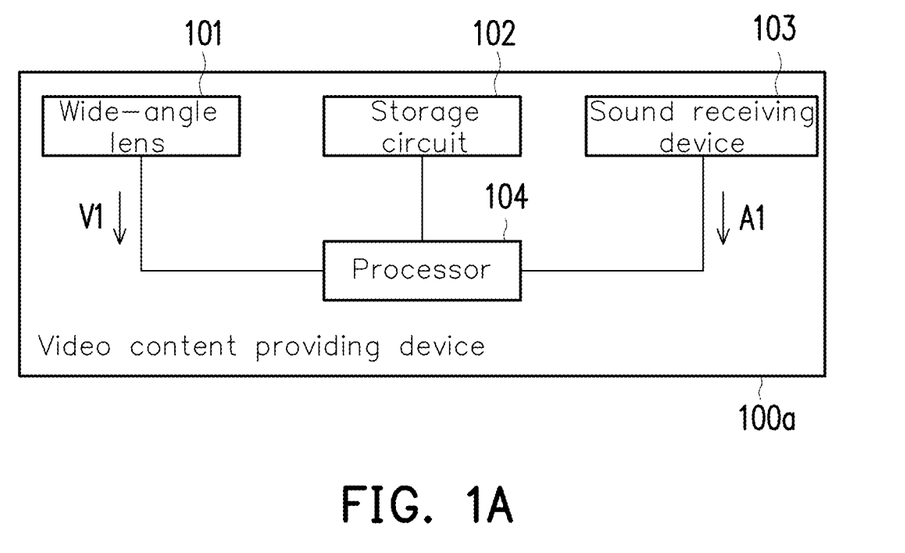
FIG. 1A is a schematic diagram of a video content providing device according to a first embodiment of the disclosure.

Throughout this specification and the appended claims, the term "video" or "video content" as referred to includes image streams and corresponding sound signals (audio signals) thereof. With reference to FIG. 1A, which is a schematic diagram of a video content providing device according to a first embodiment of the disclosure. In FIG. 1A, a video content providing device 100a may include a wide-angle lens 101, a storage circuit 102, a sound receiving device 103, and a processor 104. In an embodiment, the video content providing device 100a may be disposed in a conference room, and may be configured to capture image streams of a plurality of conference participants in the conference room through the wide-angle lens 101 (e.g., a 360-degree lens), and receive sound signals of the conference participants through the sound receiving device 103 (e.g., a microphone array with a 360-degree sound receiving range).

In an embodiment, the video content providing device 100a may be disposed at a position, for example, being located in the middle of the conference room, so that the surroundings of the video content providing device 100a may be captured by the wide-angle lens 101. In this scenario, sounds in the surroundings of the video content providing device 100a may also be received by the sound receiving device 103. Nonetheless, the disclosure is not limited thereto.

In different embodiments, the storage circuit 102 is, for example, any type of fixed or removable random access memory (RAM), read-only memory (ROM), flash memory, hard disk, or other similar devices or a combination of these devices. The storage circuit 102 may be configured to record a plurality of programming codes or modules.

In some embodiments, the processor 104 is coupled to the wide-angle lens 101, the storage circuit 102, and the sound receiving device 103. The processor 104 may also be a general-purpose processor, special-purpose processor, traditional processor, digital signal processor, a plurality of microprocessors, one or more microcontrollers combined with a digital signal processor core, controller, microcontroller, application specific integrated circuit (ASIC), field programmable gate array (FPGA), any other form of integrated circuit, state machine, Advanced RISC Machine (ARM) processor, and the like.

In some embodiments, after the wide-angle lens 101 captures the surrounding environment, a wide viewing angle image stream V1 may accordingly be provided to the processor 104. The term wide viewing angle is defined as a horizontal viewing angle of 120 degrees or more. The wide-angle lens 101 is defined as having a field of view (FOV) of 120 degrees or more. In addition, after the sound receiving device 103 receives the sounds in the surrounding environment, a first audio content A1 may accordingly be provided to the processor 104. Nonetheless, the disclosure is not limited thereto.

In some embodiments, after the processor 104 obtains the wide viewing angle image stream V1 and the first audio content A1, a specific video content may be generated accordingly. In an embodiment, the processor 104 may, for example, provide the specific video content to other applications/software for subsequent applications. For example, when people in the conference room have a video conference with another group of people using the video content providing device 100a, the processor 104 may provide the generated specific video content to video conference software. In this case, the video conference software may present the specific video content corresponding to the conference room on an interface of the video conference software for other participants in the video conference to watch. Nonetheless, the disclosure is not limited thereto.

Figure 1B:
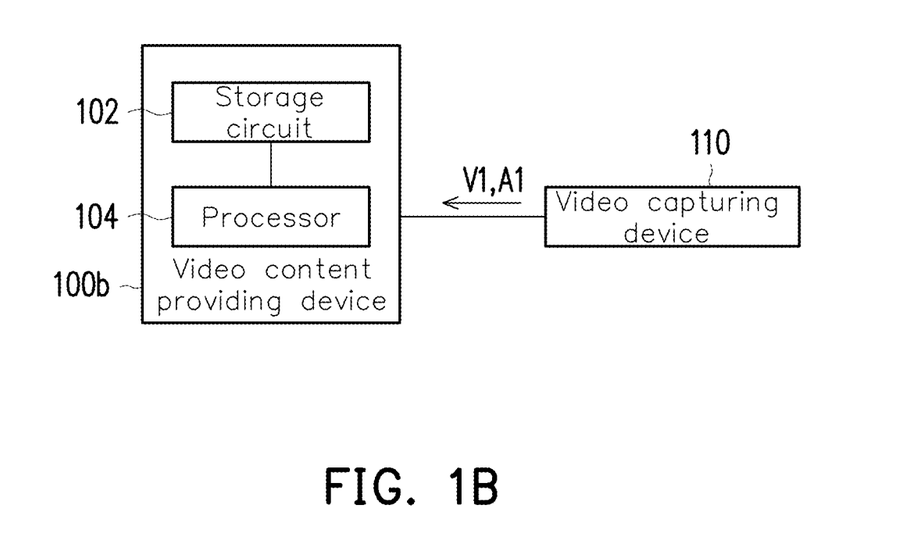
FIG. 1B is a schematic diagram of a video content providing device and a video capturing device according to a second embodiment of the disclosure.

With reference to FIG. 1B, which is a schematic diagram of a video content providing device and a video capturing device according to a second embodiment of the disclosure. In FIG. 1B, a video capturing device 110 may include, for example, the wide-angle lens 101 and the sound receiving device 103 in FIG. 1A. Similar to the video content providing device 100a of FIG. 1A, the video capturing device 110 may be disposed in a conference room, and may be configured to capture image streams of a plurality of conference participants in the conference room through the wide-angle lens 101 (e.g., a 360-degree lens), and receive sound signals of the conference participants through the sound receiving device 103 (e.g., a microphone array with a 360-degree sound receiving range).

The difference from the embodiment in FIG. 1A is that, after the video capturing device 110 of FIG. 1B captures the surrounding environment and receives the sounds in the surrounding environment, the wide viewing angle image stream V1 and the first audio content A1 may accordingly be provided to an external video content providing device 100b (which includes, for example, various forms of computer devices and/or smart devices) for the video content providing device 100b to generate the specific video content based on the wide viewing angle image stream V1 and the first audio content A1, but not limited thereto. In another embodiment, the wide-angle lens 101 and the sound receiving device 103 may be two different devices and provide the wide viewing angle image stream V1 and the first audio content A1 to the video content providing device 100b through different paths.

After the video content providing device 100b generates the specific video content, the generated specific video content may similarly be provided to the video conference software to realize the above-mentioned applications, but is not limited thereto.

As shown in FIG. 1B, the video content providing device 100b may include the storage circuit 102 and the processor 104. For their possible relevant implementations, reference may be to the description in the above embodiments, which will not be repeated herein.

In the embodiment of the disclosure, the processor 104 in the first embodiment or the second embodiment may access the modules and programming codes recorded in the storage circuit 102 to realize the video content providing method provided by the disclosure. Details thereof are described below.

Figure 2:
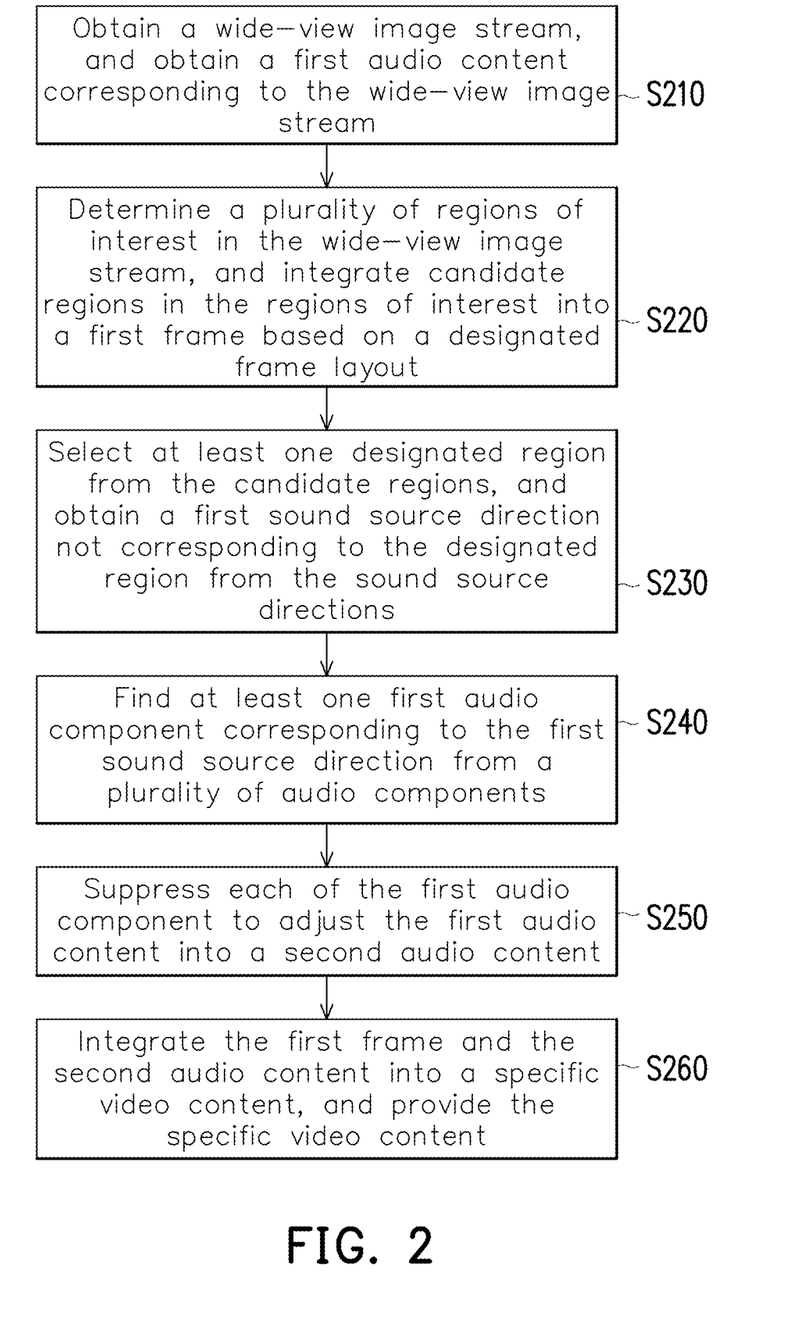
FIG. 2 is a flowchart of a video content providing method according to an embodiment of the disclosure.

With reference to FIG. 2, FIG. 2 is a flowchart of a video content providing method according to an embodiment of the disclosure. The method of this embodiment may be performed by the video content providing device 100a of FIG. 1A or the video content providing device 100b of FIG. 1B. Details of each step of FIG. 2 accompanied with the elements shown in FIG. 1A and FIG. 1B will be described below.

First, in step S210, the processor 104 may obtain the wide viewing angle image stream V1, and obtain the first audio content A1 corresponding to the wide viewing angle image stream V1. The first audio content A1 includes a plurality of audio components corresponding to a plurality of sound source directions.

In different embodiments, the processor 104 may identify the audio components of the sound source directions based on various conventional audio orientation detection and source separation technologies.

In some embodiments, during detection of the audio direction, the processor 104 may estimate the direction of arrival (DOA) based on beamforming by using a microphone array, for example. In addition, assuming that the microphone array is configured with a plurality of predetermined sound receiving directions (e.g., 0 degree/90 degrees/ 180 degrees/270 degrees), the processor 104 may directly treat the received sounds as coming from the predetermined sound receiving directions. In an embodiment, the processor 104 may also estimate the sound source directions based on a device/technology called Ambisonics. For details thereof, reference may be made to related prior art documents, which will not be repeatedly described herein.

In some embodiments, the processor 104 may perform source separation based on, for example, beamformer-least square solution, linearly constrained minimum-variance (LCMV) beamformer, and the like. In addition, the processor 104 may also realize source separation based on the content of literature documents "A. Hyvaerinen, J. Karhunen, and E. Oja, *Independent component analysis*, John Wiley & Sons, 2001", "P. Bofill and M. Zibulevsky, *Blind separation of more sources than mixtures using sparsity of their short-time Fourier transform*, Proc. ICA2000, pp. 87-92, 2000/06", and the like. Nonetheless, the disclosure is not limited thereto.

Briefly speaking, after the processor 104 obtains the first audio content A1 (which is, for example, a microphone signal) provided by the sound receiving device 103, the processor 104 may track the DOA of the plurality of sound sources by utilizing sound source direction estimation technology. After that, the processor 104 may perform multi-sound source direction estimation and sound source tracking. Then, the processor 104 may perform source separation and segmentation on the tracked sound sources to obtain the audio components corresponding to the sound source directions. Nonetheless, the disclosure is not limited thereto.

In some embodiments, the wide viewing angle image stream V1 may have a viewing angle range, and the first audio content A1 may have a sound receiving angle range. In this case, the processor 104 may obtain a first reference angle in the viewing angle range, obtain a second reference angle in the sound receiving angle range, and then align the first reference angle with the second reference angle. Accordingly, it is possible to prevent errors in subsequent detection due to mismatch between the viewing angle range of the wide viewing angle image stream V1 and the sound receiving angle range of the first audio content A1.

Figure 3:
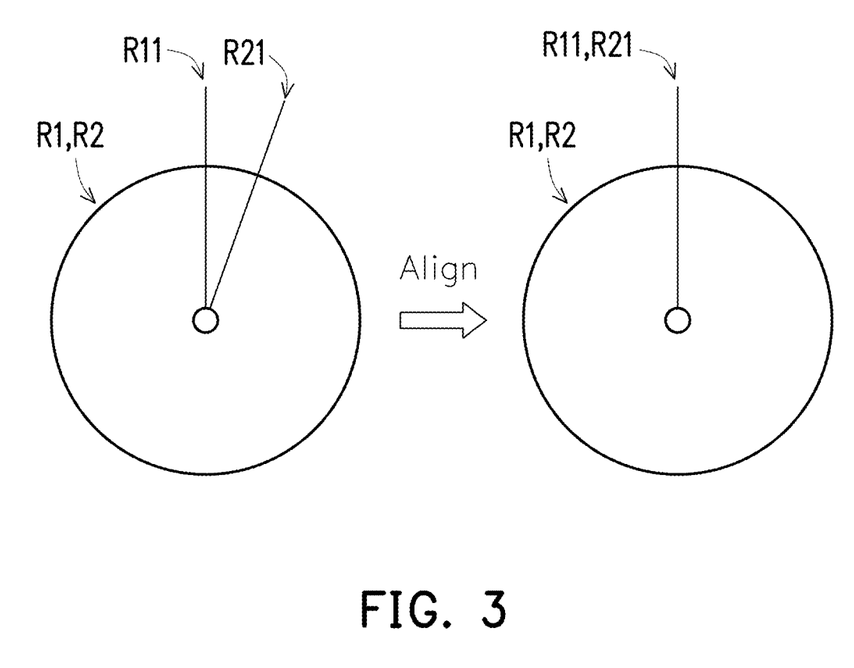
FIG. 3 is a schematic diagram showing alignment of reference angles according to an embodiment of the disclosure.

To make the aforementioned concept more comprehensible, further description accompanied by FIG. 3 will be provided below. With reference to FIG. 3, FIG. 3 is a schematic diagram showing alignment of reference angles according to an embodiment of the disclosure. In FIG. 3, it is assumed that a viewing angle range R1 of the wide viewing angle image stream V1 and a sound receiving angle range R2 of the first audio content A1 are both 360 degrees (i.e., the viewing angle of the wide-angle lens 101 and the sound receiving angle of the sound receiving device 103 are both 360 degrees). In addition, it is assumed that a first reference angle R11 in the viewing angle range R1 is the 0 degree angle in the viewing angle range R1, and a second reference angle R21 in the sound receiving angle range R2 is the 0 degree angle in the sound receiving angle range.

As can be seen from FIG. 3, although the first reference angle R11 and the second reference angle R21 are each a 0 degree angle, they are not aligned. In this case, the image and sound may not be well matched subsequently. For example, it is assumed that a person is speaking in the direction of the first reference angle R11, but the sound receiving device 103 may determine that the sound comes from the second reference angle R21. In this case, the processor 104 may subsequently not be able to properly match the image of the speaker and the corresponding sound signal. Therefore, the processor 104 may align the first reference angle R11 with the second reference angle R21 through software calibration or in other required manners. Accordingly, the occurrence of the above case can be prevented. Nonetheless, the disclosure is not limited thereto.

After that, in step S220, the processor 104 may determine a plurality of regions of interest in the wide viewing angle image stream V1, and integrate multiple candidate regions in the regions of interest into a first frame based on a designated frame layout.

Figure 4:
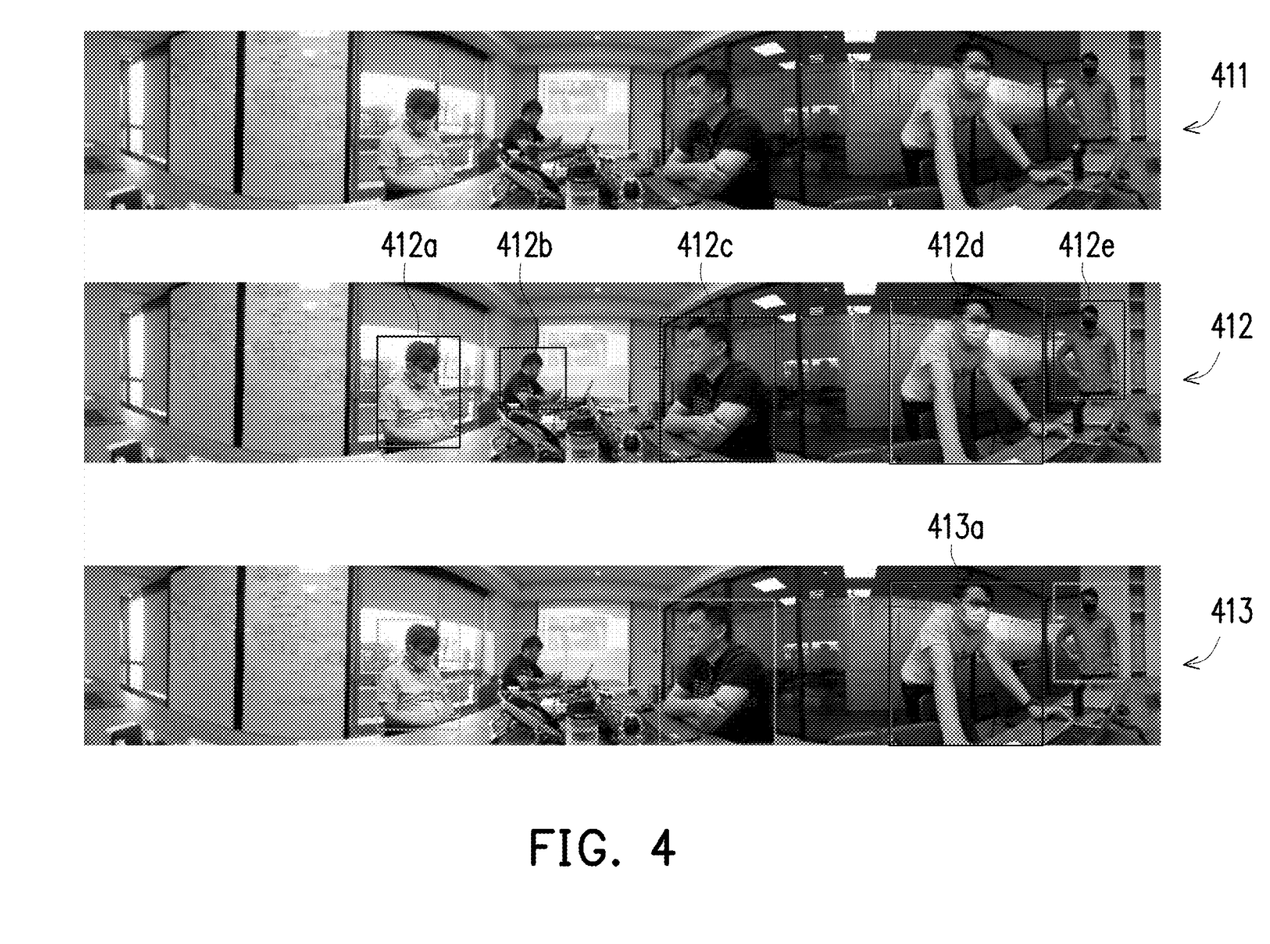
FIG. 4 is a schematic diagram showing determination of regions of interest and candidate regions according to an embodiment of the disclosure.

With reference to FIG. 4, FIG. 4 is a schematic diagram showing determination of regions of interest and candidate regions according to an embodiment of the disclosure. In FIG. 4, an image 411 is, for example, one of the images in the wide viewing angle image stream V1, and is, for example, a conference room image.

In different embodiments, the processor 104 may determine one or more regions of interest in the image 411 based on, for example, at least one of face recognition operation and human body recognition operation. The face/human body recognition operation may be performed through a corresponding artificial intelligence model and/or deep learning model. In other embodiments, the processor 104 may also perform the operation through machine learning, hidden Markov model (HMM), support vector machine (SVM), and so on.

In some embodiments, the user may also manually select a desired region (e.g., a blackboard, projection screen, and so on) in the image 411 as one of the regions of interest through relevant operation interface provided by the video content providing device 100*a* or the video content providing device 100*b*. Nonetheless, the disclosure is not limited thereto.

In some embodiments, after determining one or more regions of interest, the processor 104 may perform object tracking on the regions of interest. For example, the processor 104 may first perform feature extraction on each region of interest, and then perform tracking accordingly. In an embodiment, if a certain region of interest corresponds to a human body, the processor 104 may first perform posture estimation on the human body. After that, the processor 104 may place a predefined human body structure in the region of interest, and align the human body structure with the human body posture in the region of interest. In another embodiment, the processor 104 may also perform object tracking on the regions of interest based on foreground detection. Nonetheless, the disclosure is not limited thereto.

In an embodiment, an image 411 determined with a plurality of regions of interest may be shown as an image 412. The image 412 may include regions of interest 412*a* to 412*e*. In some embodiments, the processor 104 may monitor the distance between any two regions of interest, and determine whether the distance is less than a predetermined distance threshold. In an embodiment, in response to determining that the distance between a first region of interest and a second region of interest in the regions of interest is less than the predetermined distance threshold, the processor 104 may merge the first region of interest and the second region of interest into a third region of interest. Nonetheless, the disclosure is not limited thereto.

In some embodiments, the regions of interest 412*a* to 412*e* may be individually identified with an attribute, and the attribute is, for example, one of a plurality of predetermined attributes. In some embodiments, the predetermined attributes include, for example but not limited to, "pinned", "speaking", "merged", "including multiple individuals", "static", and "identified". In some embodiments, the attributes may be obtained from identification by the processor 104, or obtained from manual selection by the user. Nonetheless, the disclosure is not limited thereto.

In some embodiments, the regions of interest 412a to 412e may also be configured with corresponding priority levels corresponding to their respective attributes. For example, a region of interest whose attribute is "pinned" may have a priority level of 1 (e.g., the highest priority level); a region of interest whose attribute is "talking" may have a priority level of 2; a region of interest whose attribute is "merged" or "including multiple individuals" may have a priority level of 3; a region of interest whose attribute is "dynamic" may have a priority level of 4; and a region of interest whose attribute is "static" and "identified" may have a priority level of 5 (e.g., the lowest priority level). Nonetheless, the disclosure is not limited thereto.

In some embodiments, the processor 104 may determine at least one candidate region from the regions of interest 412a to 412e on different bases. For example, assuming that the region of interest 412d corresponds to the main speaker of a conference, then the user may manually select the region of interest 412d as one of the candidate regions, as shown by a candidate region 413a in an image 413. Nonetheless, the disclosure is not limited thereto.

In an embodiment, the processor 104 may, for example, integrate the frame content of the candidate regions into the designated frame layout. The designated frame layout is, for example, one of a plurality of predetermined frame layouts. In different embodiments, the predetermined frame layouts may include one or more frame boxes. After determining the designated frame layout, the processor 104 may determine to select which of the regions of interest as the required candidate regions according to the number of frame boxes in the designated frame layout.

In an embodiment, assuming that the selected designated frame layout includes N (N is a positive integer) frame boxes, then the processor 104 may randomly select N regions of interest from the regions of interest as the candidate regions, for example. In another embodiment, the processor 104 may determine the candidate regions based on the attributes of the regions of interest. For example, the processor 104 may rank the regions of interest in descending power based on the priority levels of the regions of interest, and then select the top N ranked regions of interest from the regions of interest as the candidate regions. Nonetheless, the disclosure is not limited thereto.

Figure 5:
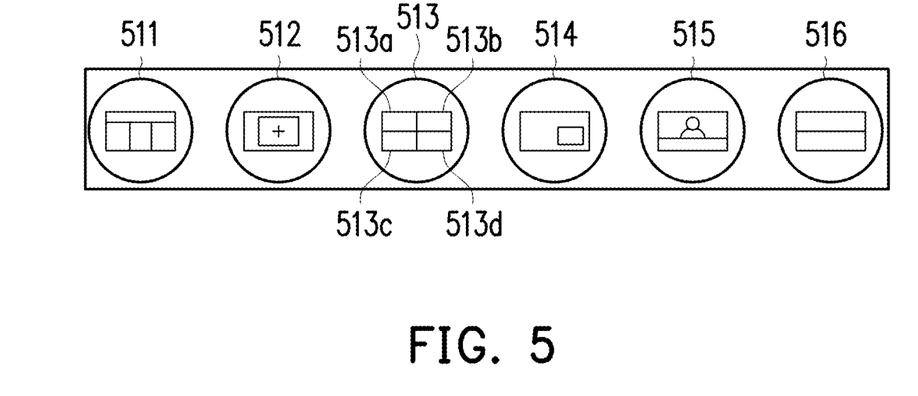
FIG. 5 is a schematic diagram of a plurality of predetermined frame layouts according to an embodiment of the disclosure.

With reference to FIG. 5, FIG. 5 is a schematic diagram of a plurality of predetermined frame layouts according to an embodiment of the disclosure. In FIG. 5, the processor 104 may select one of predetermined frame layouts 511 to 516 as the designated frame layout, for example, according to the content of Taiwanese Patent Application No. 109145738 (the entirety of which is incorporated by reference herein). Alternatively, the user may manually select one of the predetermined frame layouts 511 to 516 as the designated frame layout. Nonetheless, the disclosure is not limited thereto.

In an embodiment, it is assumed that the predetermined frame layout 513 is selected as the designated frame layout. In this case, since the predetermined frame layout 513 includes 4 (i.e., N is 4) frame boxes 513a to 513d, the processor 104 may, for example, select 4 regions of interest with relatively high priority levels from the regions of interest as the candidate regions. Nonetheless, the disclosure is not limited thereto.

Figure 6:
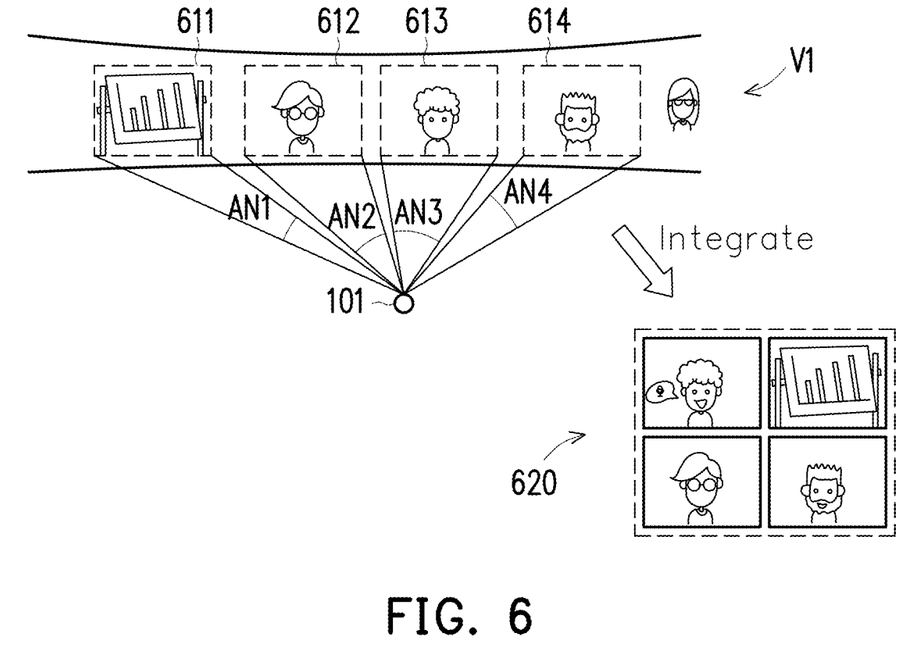
FIG. 6 is a schematic diagram showing integration of candidate regions into a first frame according to an embodiment of the disclosure.

With reference to FIG. 6, FIG. 6 is a schematic diagram showing integration of candidate regions into a first frame according to an embodiment of the disclosure. In FIG. 6, it is assumed that candidate regions 611 to 614 are determined in the wide viewing angle image stream V1. In this case, assuming that the selected designated frame layout is the predetermined frame layout 513 of FIG. 5, then the processor 104 may accordingly integrate the candidate regions 611 to 614 into a first frame 620. As can be seen from the first frame 620, the candidate regions 611 to 614 are arranged in the four frame boxes of the predetermined frame layout 513. Nonetheless, the disclosure is not limited thereto.

With reference to FIG. 2 again, after integrating the candidate regions into the first frame, in step S230, the processor 104 may select a designated region from the candidate regions, and obtain a first sound source direction that does not correspond to the designated region from the sound source directions.

In an embodiment, the processor 104 may select one or more of the candidate regions as the designated region according to certain principles. For example, after recognizing that certain candidate regions correspond to the main speaker of the conference, the processor 104 may treat the candidate regions as the designated region. In another embodiment, after the user selects one or more of the candidate regions, the processor 104 may also define the candidate regions selected by the user as the designated region. In some embodiments, the processor 104 may also treat all of the candidate regions as the designated region. Nonetheless, the disclosure is not limited thereto.

After determining the designated region, the processor 104 may obtain a viewing angle corresponding to the designated region, and find a specific sound source direction that does not correspond to the viewing angle from the sound source directions. To facilitate explanation, FIG. 6 is taken as an example for description below.

In FIG. 6, it is assumed that only the candidate region 613 (which, for example, corresponds to the main speaker) in the candidate regions 611 to 614 is selected as the designated region. In this case, the processor 104 may obtain a viewing angle (e.g., an angle AN3) corresponding to the candidate region 613, and find one or more specific sound source directions that do not correspond to the viewing angle.

In some embodiments, the specific sound source direction may correspond to, for example but not be limited to, directions of the candidate regions 611, 612, 614 and/or directions of other sounds received by the sound receiving device 103. After that, the processor 104 may take the specific sound source direction as the first sound source direction that does not correspond to the designated region.

In the scenario of FIG. 6, the processor 104 may, for example, take the sound source directions at the viewing angles (i.e., angles AN1, AN2, AN4) corresponding to the candidate regions 611, 612, and 614 as the first sound source direction. Nonetheless, the disclosure is not limited thereto.

After that, in step S240, the processor 104 may find a first audio component corresponding to the first sound source direction from the audio components. After that, in step S250, the processor 104 may suppress each first audio component to adjust the first audio content A1 into a second audio content A2.

Figure 7A:
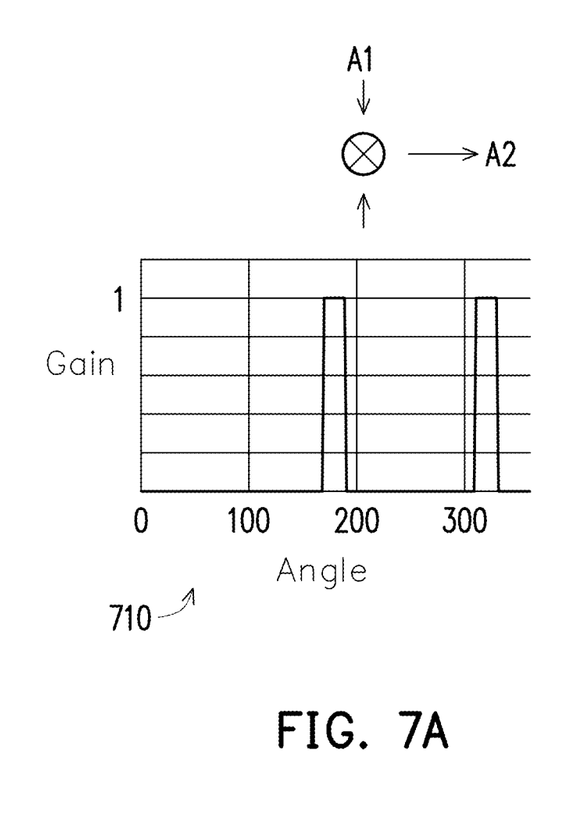
FIG. 7A is a schematic diagram showing suppression of audio components according to a third embodiment of the disclosure.

With reference to FIG. 7A, FIG. 7A is a schematic diagram showing suppression of audio components according to a third embodiment of the disclosure. In an embodiment, the processor 104 may obtain a second sound source direction corresponding to the designated region from the sound source directions of the first audio content A1, and generate a filter function 710 based on the first sound source direction and the second sound source direction. A gain of the filter function 710 in the first sound source direction is a suppression factor, and the suppression factor may be less than 1.

In FIG. 7A, assuming that the second sound source direction corresponding to the designated region is 170 degrees to 190 degrees and 310 degrees to 350 degrees, then other sound source directions other than the second sound source direction may be understood as the first sound source direction. Correspondingly, in the filter function 710 generated by the processor 104, the gain corresponding to each first sound source direction may be 0, and the gain corresponding to each second sound source direction may be 1. Nonetheless, the disclosure is not limited thereto.

In this case, after the filter function 710 is multiplied with the first audio content A1, only the audio components located at 170 degrees to 190 degrees and 310 degrees to 350 degrees (which correspond to the designated region) are retained, and audio components from other angles are suppressed. Nonetheless, the disclosure is not limited thereto.

In brief, the processor 104 may suppress audio components not coming from the designated region (e.g., the region including the main speaker), thus improving the sound quality of the second audio content A2.

In another embodiment, step S250 of FIG. 2 may also be realized as enhancing second audio components corresponding to the designated region by the processor 104 to adjust the first audio content A1 into the second audio content A2. In other words, the processor 104 may obtain the second sound source direction corresponding to the designated region from the sound source directions of the first audio content A1, and generate the filter function 710 based on the first sound source direction and the second sound source direction. The gain of the filter function 710 in the second sound source direction is an enhancement factor, and the enhancement factor may be greater than 1. In another embodiment, step S250 of FIG. 2 may also be realized as suppressing part of the first audio components and enhancing part of the second audio components by the processor 104 to adjust the first audio content A1 into the second audio content A2.

Taking the scenario of FIG. 6 as an example, it is assumed that the designated region is the candidate region 613 corresponding to the main speaker. In this case, the processor 104 may suppress each of the sounds from the candidate regions 611, 612, and 614 to generate the second audio content A2. In this case, the second audio content A2 includes only the audio components corresponding to the main speaker, but does not include other audio components that do not correspond to the main speaker. Accordingly, the sound quality of the second audio content A2 can be effectively improved.

It should be understood that in the scenario of FIG. 7A, since the range with a gain of 1 are relatively steep at both sides, when the corresponding sound source (e.g., the main speaker) moves away from the corresponding angle range, the related sound signals are suppressed abruptly, which may result in unfavorable hearing experience. In an embodiment, the issue may also be improved through a mechanism as shown in FIG. 7B.

Figure 7B:
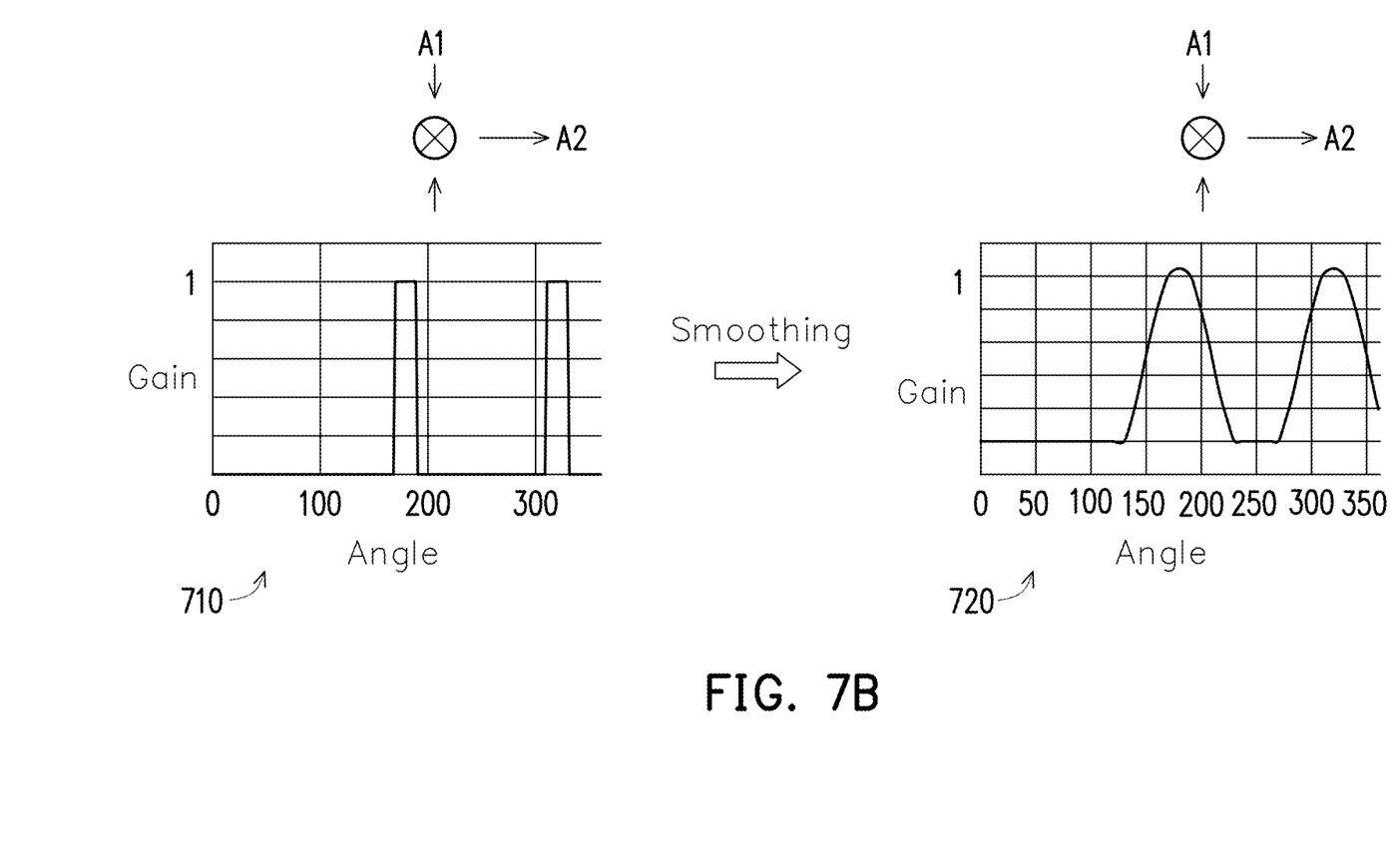
FIG. 7B is a schematic diagram showing performance of a smoothing operation according to FIG. 7A.

With reference to FIG. 7B, FIG. 7B is a schematic diagram showing performance of a smoothing operation according to FIG. 7A. In an embodiment, after the filter function 710 is generated, the processor 104 may perform a smoothing operation on the filter function 710, for example. In FIG. 7B, the filter function 710 may be understood as inclusive of a plurality of square waves with a height of 1, and the processor 104 may, for example, multiply each square wave by a Gaussian function (or other functions that may be configured to smooth the waves) to perform the smoothing operation on the filter function 710. Nonetheless, the disclosure is not limited thereto.

In an embodiment, it is assumed that the filter function 710 after the smoothing operation is presented as a filter function 720. After that, the processor 104 may multiply the filter function 720 by the first audio content A1 to generate the second audio component A2. In this case, not only audio components that do not come from the designated region (e.g., the region including the main speaker) can be suppressed, but the abrupt suppression of sound signals can also be prevented, thus further improving the sound quality of the second audio content A2.

In other embodiments, the designer may also directly design the filter function 710 as a smoothing function depending on the requirements for the processor 104 to generate the second audio component A2 by multiplying the filter function 710 by the first audio content A1. Accordingly, the abrupt suppression of sound signals can similarly be prevented, thus further improving the sound quality of the second audio content A2.

After the second audio content A2 is obtained, in step S260, the processor 104 may integrate the first frame and the second audio content A2 into the specific video content and provide the specific video content.

Taking FIG. 6 as an example, after the second audio content A2 corresponding to the scenario of FIG. 6 is obtained through the above teaching, the processor 104 may integrate the first frame 620 and the second audio content A2 into the corresponding specific video content, for example. As mentioned earlier, the processor 104 may provide the specific video content to the video conference software, for example. In this case, the video conference software may then present the specific video content on the interface of the video conference software for other participants in the video conference to watch.

In addition, since only the audio content corresponding to the designated region (which, for example, corresponds to the main speaker) is retained in the specific video content, other participants in the video conference do not hear audio content that does not come from the designated region. Accordingly, other participants in the video conference can experience better sound quality.

Figure 8:
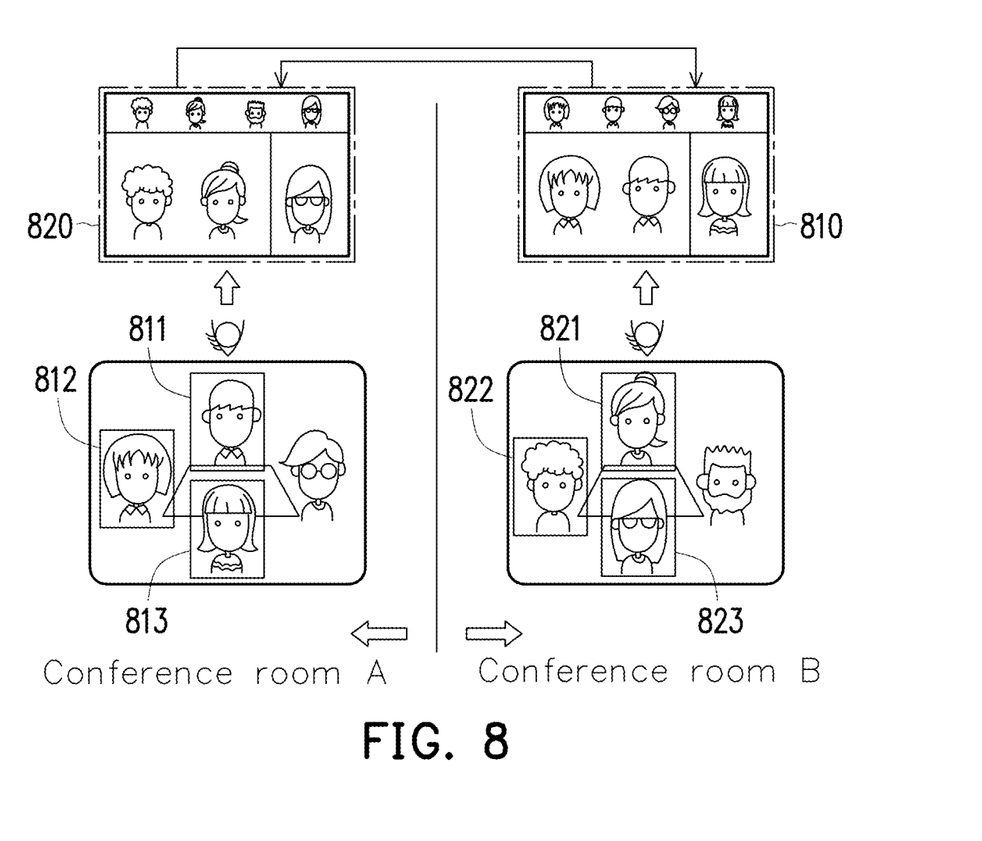
FIG. 8 is an application scenario diagram according to an embodiment of the disclosure.

With reference to FIG. 8, FIG. 8 is an application scenario diagram according to an embodiment of the disclosure. In FIG. 8, it is assumed that people in conference rooms A and B are having a video conference, and the conference rooms A and B are respectively provided with a first video content providing device and a second video content providing device (which may be individually embodied as the video content providing device 100*a* of FIG. 1A). In this case, the first video content providing device located in the conference room A may generate a first frame 810 based on designated regions 811 to 813 according to the above teaching, for example. Moreover, the first video content providing device may also generate a corresponding second audio content A2*a* according to the above teaching. In the second audio content A2*a*, for example, it is possible that only audio content corresponding to the designated regions 811 to 813 is retained. After that, the first video content providing device may integrate the first frame 810 and the second audio content A2*a* into a specific video content and provide the specific video content to the video conference software. In this case, people located in the conference room B can see the first frame 810 and can hear only the audio content corresponding to the designated regions 811 to 813.

In FIG. 8, the second video content providing device located in the conference room B may also perform similar operations for people in the conference room A to see a first frame 820 and hear only audio content corresponding to designated regions 821 to 823. Nonetheless, the disclosure is not limited thereto.

In some embodiments, the user may also select one or more sounds to be suppressed from the designated regions 811 to 813 and 821 to 823. In this case, the first and second video content providing devices may accordingly suppress the audio content corresponding to the one or more sounds to be suppressed selected by the user. Nonetheless, the disclosure is not limited thereto. For example, in FIG. 8, people located in the conference room A may select one or more of sounds to be suppressed, for example, the position corresponding to the designated region 811, from the first frame 810 for people in the conference room B to hear only the audio content corresponding to the designated regions 812 and 813. In addition, people in the conference room A may also select one or more sounds to be suppressed, for example, the position corresponding to the designated region 821, from the first frame 820 for people in the conference room A to hear only the audio content corresponding to the designated regions 822 and 823. In another embodiment, the user may also select one or more sounds to be enhanced, or select one or more sounds to be suppressed and sounds to be enhanced at the same time or separately, from the designated regions 811 to 813 and 821 to 823.

Figure 9:
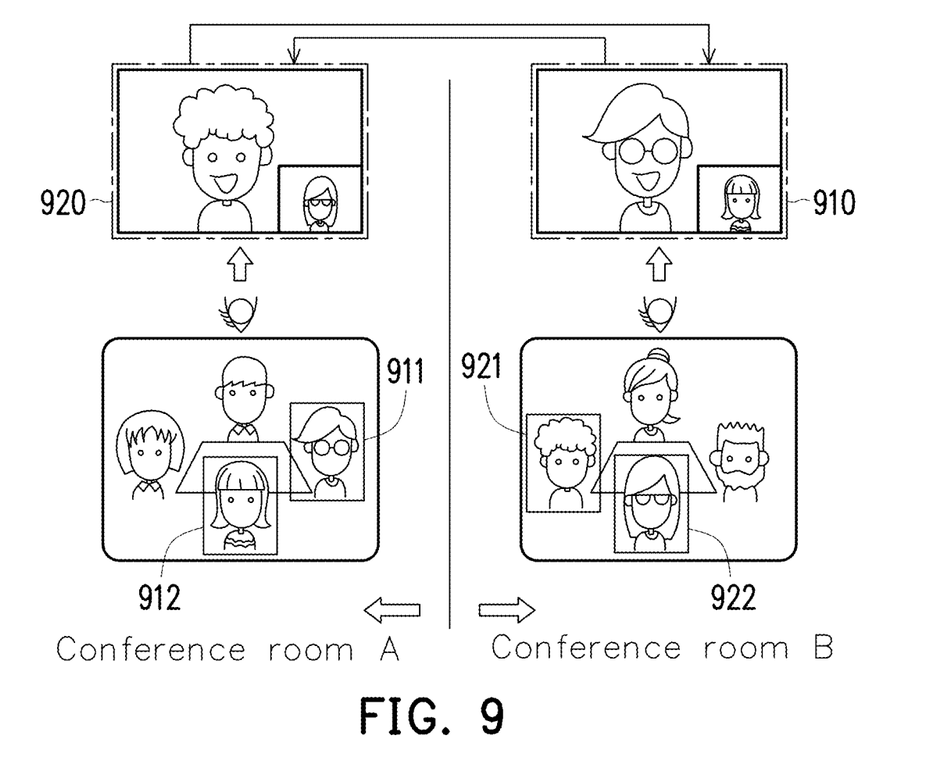
FIG. 9 is another application scenario diagram according to an embodiment of the disclosure.

With reference to FIG. 9, FIG. 9 is another application scenario diagram according to an embodiment of the disclosure. In this embodiment, the first video content providing device located in the conference room A may perform the operations taught in the above embodiments for people in the conference room B to see a first frame 910 and hear only audio content corresponding to designated regions 911 to 912. In FIG. 9, the first video content providing device may automatically switch the first frame 910 into a picture-in-picture after detecting that the designated region 911 corresponds to the main speaker, for example. In another embodiment, the audio content of the designated region 911 may be enhanced so that the volume of the designated region 911 corresponding to the main speaker is greater than that of the designated region 912.

Similarly, the second video content providing device located in the conference room B may perform the operations taught in the above embodiments for people in the conference room A to see a first frame 920 presented as a picture-in-picture and hear only audio content corresponding to designated regions 921 to 922. Nonetheless, the disclosure is not limited thereto. In another embodiment, the audio content of the designated region 921 may also be enhanced so that the volume of the designated region 921 corresponding to the main speaker is greater than that of the designated region 922.

In summary of the foregoing, in the embodiments of the disclosure, after one or more designated regions are determined based on the wide viewing angle image stream, the designated regions may be integrated into the first frame, and the audio components that do not correspond to the designated regions in the first audio content may be suppressed to generate the second audio content. After that, according to the disclosure, the first frame and the second audio content may be integrated into the specific video content. In this case, the user who watch the specific video content can then hear only the audio components corresponding to the designated regions, thereby obtaining better listening quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A video content providing method adapted for a video content providing device, the method comprising:
obtaining a wide viewing angle image stream, and obtaining a first audio content corresponding to the wide viewing angle image stream, wherein the first audio content comprises a plurality of audio components corresponding to a plurality of sound source directions;
determining a plurality of regions of interest in the wide viewing angle image stream, and integrating at least one candidate region in the regions of interest into a first frame based on a designated frame layout;
selecting at least one designated region from the at least one candidate region, and obtaining at least one first sound source direction not corresponding to the at least one designated region from the sound source directions;
finding at least one first audio component corresponding to the at least one first sound source direction from the audio components;
suppressing each of the first audio component to adjust the first audio content into a second audio content; and
integrating the first frame and the second audio content into a specific video content, and providing the specific video content.

2. The method according to claim 1, wherein each of the regions of interest is determined through at least one of a manual selection operation, a face recognition operation, and a human body recognition operation.

3. The method according to claim 1, wherein the wide viewing angle image stream has a viewing angle range, the first audio content has a sound receiving angle range, and after obtaining the wide viewing angle image stream, and obtaining the first audio content corresponding to the wide viewing angle image stream, the method further comprises:
obtaining a first reference angle in the viewing angle range, and obtaining a second reference angle in the sound receiving angle range; and
aligning the first reference angle with the second reference angle.

4. The method according to claim 1, wherein obtaining the at least one first sound source direction not corresponding to the at least one designated region from the sound source directions comprises:
obtaining at least one viewing angle corresponding to the at least one designated region;
finding at least one specific sound source direction not corresponding to the at least one viewing angle from the sound source directions, and taking the at least one specific sound source direction as the at least one first sound source direction not corresponding to the at least one designated region.

5. The method according to claim 1, wherein determining the regions of interest in the wide viewing angle image stream comprises:
in response to determining that a distance between a first region of interest and a second region of interest in the regions of interest is less than a predetermined distance threshold, combining the first region of interest and the second region of interest into a third region of interest, such that the regions of interest comprise the third region of interest.

6. The method according to claim 1, wherein each of the regions of interest has an attribute, and the method further comprises:
determining the at least one candidate region based on the attribute of each of the regions of interest.

7. The method according to claim 6, wherein the designated frame layout comprises N frame boxes, the attribute of each of the regions of interest comprises a priority level, and determining the at least one candidate region based on the attribute of each of the regions of interest comprises:
ranking the regions of interest in descending power based on the priority level of each of the regions of interest; and
selecting top N number of ranked regions of interest from the regions of interest as the at least one candidate region, where N is a positive integer.

8. The method according to claim 1, wherein suppressing the at least one first audio component to adjust the first audio content into the second audio content comprises:
obtaining at least one second sound source direction corresponding to the at least one designated region from the sound source directions;
generating a filter function based on the at least one first sound source direction and the at least one second sound source direction, wherein a gain of the filter function in the at least one first sound source direction is a suppression factor, where the suppression factor is less than 1; and
multiplying the first audio content by the filter function to adjust the first audio content into the second audio content.

9. The method according to claim 8, wherein before multiplying the first audio content by the filter function, the method further comprises:
performing a smoothing operation on the filter function.

10. The method according to claim 8, wherein the filter function is a smoothing function.

11. The method according to claim 1, wherein suppressing the at least one first audio component to adjust the first audio content into the second audio content comprises:
obtaining at least one second sound source direction corresponding to the at least one designated region from the sound source directions;
generating a filter function based on the at least one first sound source direction and the at least one second sound source direction, wherein a gain of the filter function in the at least one second sound source direction is an enhancement factor, where the enhancement factor is greater than 1; and
multiplying the first audio content by the filter function to adjust the first audio content into the second audio content.

12. The method according to claim 1, wherein suppressing the at least one first audio component to adjust the first audio content into the second audio content comprises:
obtaining at least one second sound source direction corresponding to the at least one designated region from the sound source directions;
generating a filter function based on the at least one first sound source direction and the at least one second sound source direction, wherein a gain of the filter function in the at least one first sound source direction is a suppression factor, and a gain of the filter function in the at least one second sound source direction is an enhancement factor, where the suppression factor is less than 1 and the enhancement factor is greater than 1; and
multiplying the first audio content by the filter function to adjust the first audio content into the second audio content.

13. The method according to claim 1, wherein each of the regions of interest has a weight, and the process of adjusting the first audio content into the second audio content further comprises:
obtaining at least one second sound source direction corresponding to the at least one designated region from the sound source directions;
finding at least one second audio component corresponding to the at least one second sound source direction from the audio components; and
adjusting each of the corresponding second audio component based on the weight of each of the designated region.

14. The method according to claim 13, wherein adjusting each of the corresponding second audio component based on the weight of each of the designated region comprises:
determining an adjustment factor of each of the designated region based on the weight of each of the designated region, wherein the adjustment factor of each of the designated region is positively correlated with the weight of each of the designated region; and
multiplying each of the second audio component by the corresponding adjustment factor.

15. The method according to claim 1, wherein selecting the at least one designated region from the at least one candidate region comprises:
identifying at least one region corresponding to at least one speaker from the at least one candidate region, and defining the at least one region as the at least one designated region.

16. The method according to claim 1, wherein selecting the at least one designated region from the at least one candidate region comprises:
finding at least one manually selected region from the at least one candidate region, and defining the at least one region as the at least one designated region.

17. The method according to claim 1, wherein the video content providing device comprises a wide-angle lens and a sound receiving device, and the method comprises:
obtaining the wide viewing angle image stream through the wide-angle lens, and obtaining the first audio content corresponding to the wide viewing angle image stream through the sound receiving device.

18. The method according to claim 1, wherein providing the specific video content comprises:
providing the specific video content as a video conference content to a video conference software.

19. A video content providing device, comprising:
a non-transitory storage circuit storing a programming code; and
a processor coupled to the non-transitory storage circuit and accessing the programming code to:
obtain a wide viewing angle image stream, and obtain a first audio content corresponding to the wide viewing angle image stream, wherein the first audio content comprises a plurality of audio components corresponding to a plurality of sound source directions;

determine a plurality of regions of interest in the wide viewing angle image stream, and integrate at least one candidate region in the regions of interest into a first frame based on a designated frame layout;

select at least one designated region from the at least one candidate region, and obtain at least one first sound source direction not corresponding to the at least one designated region from the sound source directions;

find at least one first audio component corresponding to the at least one first sound source direction from the audio components;

suppress each of the first audio component to adjust the first audio content into a second audio content; and integrate the first frame and the second audio content into a specific video content, and provide the specific video content.

20. The video content providing device according to claim 19, further comprising:

a wide-angle lens configured to capture the wide viewing angle image stream; and a sound receiving device configured to receive the first audio content corresponding to the wide viewing angle image stream.

* * * * *